US010304457B2

(12) United States Patent
Suzuki et al.

(10) Patent No.: US 10,304,457 B2
(45) Date of Patent: May 28, 2019

(54) TRANSCRIPTION SUPPORT SYSTEM AND TRANSCRIPTION SUPPORT METHOD

(75) Inventors: Hirokazu Suzuki, Tokyo (JP); Nobuhiro Shimogori, Kanagawa (JP); Tomoo Ikeda, Tokyo (JP); Kouji Ueno, Kanagawa (JP); Osamu Nishiyama, Kanagawa (JP); Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 375 days.

(21) Appl. No.: 13/420,827

(22) Filed: Mar. 15, 2012

(65) Prior Publication Data

US 2013/0030805 A1 Jan. 31, 2013

(30) Foreign Application Priority Data

Jul. 26, 2011 (JP) ................................ 2011-163246

(51) Int. Cl.
*G10L 15/26* (2006.01)

(52) U.S. Cl.
CPC .................................... *G10L 15/26* (2013.01)

(58) Field of Classification Search
CPC ....... G10L 15/26; G10L 15/265; G10L 15/54; G10L 15/187; G10L 15/063; G06F 17/30746
USPC ................. 704/211, 231, 235, 260, 270, 276
See application file for complete search history.

(56) References Cited

U.S. PATENT DOCUMENTS 5,333,275 A * 7/1994 Wheatley et al. ............ 704/243
6,260,011 B1 * 7/2001 Heckerman et al. ......... 704/235
6,282,510 B1 * 8/2001 Bennett et al. ............... 704/235
6,338,038 B1 * 1/2002 Hanson ......................... 704/500
(Continued)

FOREIGN PATENT DOCUMENTS

JP 2002-351484 12/2002
JP 2005-165066 6/2005
(Continued)

OTHER PUBLICATIONS

Office Action of Notice of Rejection for Japanese Patent Application No. 2011-163246 dated May 20, 2014, 4 pgs.
(Continued)

*Primary Examiner* — Matthew H Baker
(74) *Attorney, Agent, or Firm* — Amin, Turocy & Watson LLP

(57) ABSTRACT

According to one embodiment, a transcription support system supports transcription work to convert voice data to text. The system includes a first storage unit configured to store therein the voice data; a playback unit configured to play back the voice data; a second storage unit configured to store therein voice indices, each of which associates a character string obtained from a voice recognition process with voice positional information, for which the voice positional information is indicative of a temporal position in the voice data and corresponds to the character string; a text creating unit that creates the text in response to an operation input of a user; and an estimation unit configured to estimate already-transcribed voice positional information indicative of a position at which the creation of the text is completed in the voice data based on the voice indices.

10 Claims, 5 Drawing Sheets

(56) References Cited

U.S. PATENT DOCUMENTS

| | | | | |
|---|---|---|---|---|
| 6,360,237 | B1 * | 3/2002 | Schulz et al. | 715/255 |
| 6,442,518 | B1 * | 8/2002 | Van Thong et al. | 704/235 |
| 6,466,907 | B1 * | 10/2002 | Ferrieux et al. | 704/254 |
| 6,535,849 | B1 * | 3/2003 | Pakhomov et al. | 704/235 |
| 6,735,565 | B2 * | 5/2004 | Gschwendtner | 704/254 |
| 7,010,489 | B1 * | 3/2006 | Lewis et al. | 704/260 |
| 7,092,870 | B1 * | 8/2006 | Chen et al. | 704/9 |
| 7,805,298 | B2 * | 9/2010 | Bennett et al. | 704/231 |
| 8,131,545 | B1 * | 3/2012 | Moreno et al. | 704/235 |
| 8,155,958 | B2 | 4/2012 | Terao | |
| 8,325,883 | B2 * | 12/2012 | Schultz et al. | 379/52 |
| 8,332,212 | B2 * | 12/2012 | Wittenstein et al. | 704/211 |
| 8,364,486 | B2 * | 1/2013 | Basir et al. | 704/254 |
| 8,412,521 | B2 * | 4/2013 | Mathias et al. | 704/235 |
| 8,447,607 | B2 * | 5/2013 | Weider et al. | 704/250 |
| 8,543,395 | B2 * | 9/2013 | Todic | 704/235 |
| 8,595,004 | B2 * | 11/2013 | Koshinaka | 704/236 |
| 8,762,156 | B2 * | 6/2014 | Chen | G10L 15/26 704/10 |
| 2002/0010916 | A1 * | 1/2002 | Thong et al. | 725/1 |
| 2002/0143534 | A1 * | 10/2002 | Hol | 704/235 |
| 2002/0163533 | A1 * | 11/2002 | Trovato et al. | 345/728 |
| 2003/0061043 | A1 * | 3/2003 | Gschwendtner | G10L 15/08 704/254 |
| 2003/0074195 | A1 * | 4/2003 | Bartosik et al. | 704/235 |
| 2003/0177108 | A1 * | 9/2003 | Charlesworth et al. | 707/1 |
| 2004/0138894 | A1 * | 7/2004 | Kiecza et al. | 704/277 |
| 2005/0143994 | A1 | 6/2005 | Mori | |
| 2006/0015339 | A1 * | 1/2006 | Charlesworth et al. | 704/251 |
| 2006/0112812 | A1 * | 6/2006 | Venkataraman et al. | 84/616 |
| 2006/0149558 | A1 * | 7/2006 | Kahn et al. | 704/278 |
| 2006/0167685 | A1 * | 7/2006 | Thelen et al. | 704/235 |
| 2007/0033003 | A1 * | 2/2007 | Morris | 704/9 |
| 2007/0038450 | A1 * | 2/2007 | Josifovski | 704/255 |
| 2007/0106509 | A1 * | 5/2007 | Acero et al. | 704/240 |
| 2007/0143112 | A1 * | 6/2007 | Yu et al. | 704/257 |
| 2007/0179784 | A1 * | 8/2007 | Thambiratnam et al. | 704/255 |
| 2007/0198266 | A1 * | 8/2007 | Li et al. | 704/255 |
| 2008/0077392 | A1 | 3/2008 | Kamatani et al. | |
| 2008/0091433 | A1 * | 4/2008 | Dusterhoff | 704/275 |
| 2008/0195370 | A1 | 8/2008 | Neubacher et al. | |
| 2009/0030894 | A1 * | 1/2009 | Mamou | G10L 15/26 |
| 2009/0048832 | A1 | 2/2009 | Terao | |
| 2009/0119101 | A1 * | 5/2009 | Griggs | 704/235 |
| 2009/0319265 | A1 * | 12/2009 | Wittenstein et al. | 704/234 |
| 2010/0299131 | A1 * | 11/2010 | Lanham et al. | 704/2 |
| 2011/0161082 | A1 * | 6/2011 | Braho et al. | 704/251 |
| 2011/0288862 | A1 * | 11/2011 | Todic | 704/235 |
| 2012/0022865 | A1 * | 1/2012 | Milstein | 704/235 |
| 2013/0030806 | A1 | 1/2013 | Ueno et al. | |
| 2013/0191125 | A1 | 7/2013 | Suzuki | |

FOREIGN PATENT DOCUMENTS

| | | |
|---|---|---|
| JP | 2005-228178 | 8/2005 |
| JP | 2007-133033 | 5/2007 |
| JP | 2007-334429 | 12/2007 |
| JP | 2008-083855 | 4/2008 |
| JP | 2010-055030 | 3/2010 |
| JP | 2010-257425 | 11/2010 |
| JP | 5638479 | 12/2014 |
| JP | 5787780 | 9/2015 |

OTHER PUBLICATIONS

Office Action of Decision of Rejection for Japanese Patent Application No. 2011-163246 dated Feb. 3, 2015, 3 pages.

* cited by examiner

FIG.3

| UNIT OF DIVISION | | VOICE POSITIONAL INFORMATION (ms) | UNIT OF DIVISION | | VOICE POSITIONAL INFORMATION (ms) |
|---|---|---|---|---|---|
| READING | MOR-PHEME | | READING | MOR-PHEME | |
| SAKI | SAKI | 200 TO 400 | MASI | MASI | 2100 TO 2300 |
| HODO | HODO | 400 TO 600 | TA | TA | 2300 TO 2400 |
| NO | NO | 600 TO 700 | MASITA | MASITA | 2100 TO 2400 |
| NAIYOU | NAIYOU | 700 TO 1100 | MA | MA | 2100 TO 2200 |
| NAI | NAI | 700 TO 900 | ITA | ITA | 2200 TO 2400 |
| YOU | YOU | 900 TO 1100 | SI | SI | 2200 TO 2300 |
| KYOU | KYOU | 1100 TO 1400 | KEN | KEN | 2400 TO 2600 |
| GIDAI | GIDAI | 1400 TO 1700 | TAKEN | TAKEN | 2300 TO 2600 |
| KYOUGI | KYOUGI | 1100 TO 1500 | DESU | DESU | 2600 TO 2800 |
| DAI | DAI | 1500 TO 1700 | DE | DE | 2600 TO 2700 |
| NI | NI | 1700 TO 1800 | GA | GA | 2800 TO 2900 |
| GOZAI | GOZAI | 1800 TO 2100 | SUGU | SUGU | 2700 TO 2900 |
| KASAI | KASAI | 1800 TO 2100 | | | |

TRANSCRIPTION SUPPORT SYSTEM AND TRANSCRIPTION SUPPORT METHOD

CROSS-REFERENCE TO RELATED APPLICATIONS

This application is based upon and claims the benefit of priority from Japanese Patent Application No. 2011-163246, filed on Jul. 26, 2011; the entire contents of which are incorporated herein by reference.

FIELD

Embodiments described herein relate generally to a transcription support system and a transcription support method for supporting transcription work to convert voice data to text.

BACKGROUND

Conventionally, various techniques are well known in order to improve efficiency of the transcription work. For example, there is well known a technique that each of plural character strings constituting voice text data, which is obtained by performing a voice recognition process on the voice data, and a position of each of the character strings in the voice data (playback position) are displayed on a screen so as to be associated with each other. In the technique, when a character string on the screen is selected, because the voice data is played back from the playback position corresponding to the selected character string, a user (transcription worker) selects the character string, and the user corrects the character string while listening to the voice data.

In the technique, it is necessary that each of the plural character strings constituting the voice text data and the playback position of the voice data are displayed on the screen while being associated with each other, which results in a problem in that a configuration of display control becomes complicated. During the transcription work, it is rare that the voice data including a filler or a grammatical error is directly transcribed and the voice data is generally corrected or refined. As is the case with the above technique, it is not necessarily efficient to correct the voice recognition result of the voice data because there is a large difference between the voice data and the text that a user transcribes. Accordingly, from the viewpoint of simplifying the configuration of a transcription method, transcribing an audio file without any restriction while listening to the voice data is preferable to correcting the voice recognition result. In this case, the user is forced to repeatedly temporarily stop and rewind while the transcribing. When the user resumes transcribing after the temporary stop, it is desirable that the playback is resumed from the exact position at which the transcription is completed.

However, it is difficult to specify the position at which the transcription is completed in the voice data.

BRIEF DESCRIPTION OF THE DRAWINGS

FIG. 3 is a view illustrating an example of a voice index;

DETAILED DESCRIPTION

According to one embodiment, a transcription support system supports transcription work to convert voice data to text. The system includes a first storage unit configured to store therein the voice data; a playback unit configured to play back the voice data; a second storage unit configured to store therein voice indices, each of which associates a character string obtained from a voice recognition process with voice positional information, for which the voice positional information is indicative of a temporal position in the voice data and corresponds to the character string; a text creating unit that creates the text in response to an operation input of a user; and an estimation unit configured to estimate, according to the voice indices, the already-transcribed voice positional information indicative of a temporal position at which the transcription of the voice data is completed.

Hereinafter, a transcription support system according to an embodiment will be described in detail with reference to the accompanying drawings. In the following embodiments, an example in which a personal computer (PC) having a function of playing back the voice data and a text creating function of creating the text according to a user's operation is used as a transcription support system will be described, but the invention is not limited thereto. In the following embodiments, when the transcription work is performed, a user operates a keyboard to input the text while playing back the recorded voice data, thereby converting the voice data to the text.

Figure 1:
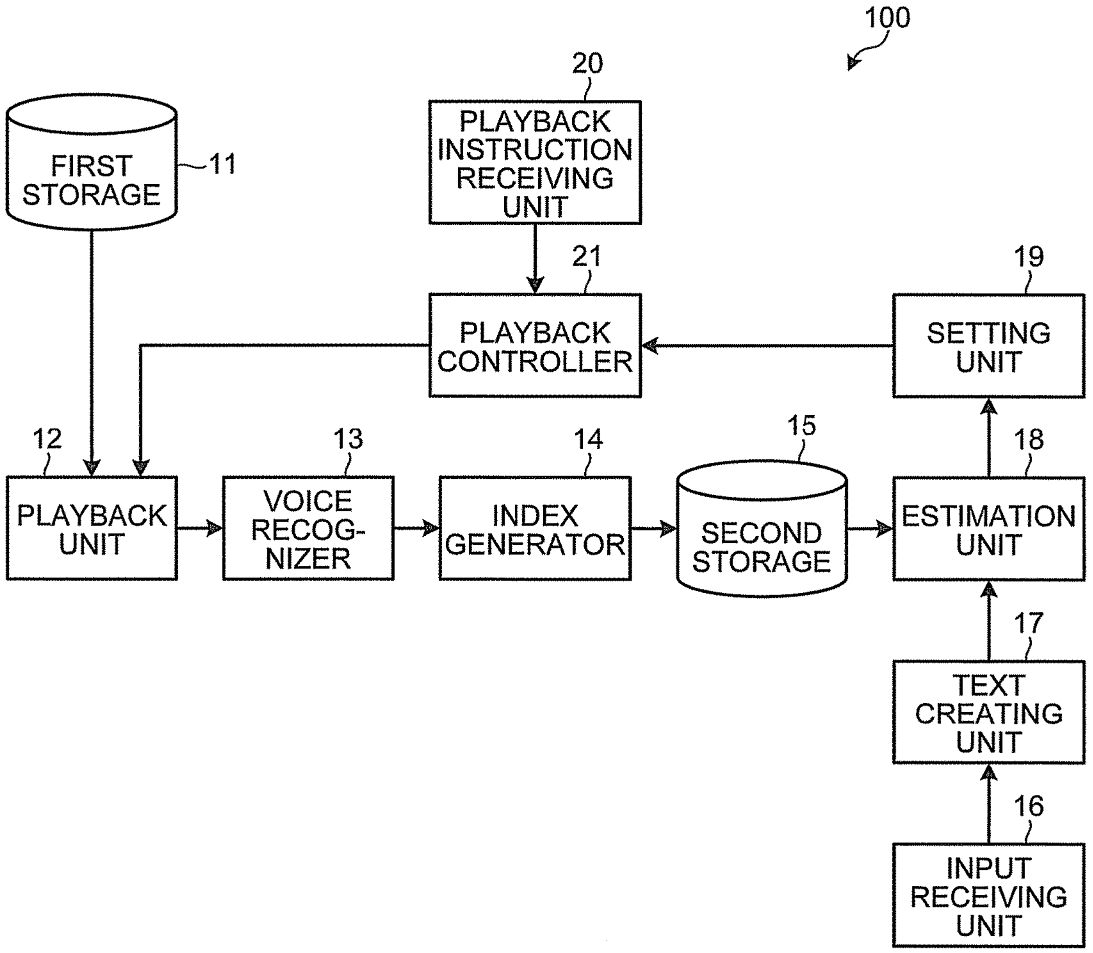
FIG. 1 is a block diagram illustrating a schematic configuration example of a transcription support system according to an embodiment.

FIG. 1 is a block diagram illustrating a schematic configuration example of a transcription support system 100 according to the embodiment. Referring to FIG. 1, the transcription support system 100 includes a first storage 11, a playback unit 12, a voice recognizer 13, an index generator 14, a second storage 15, an input receiving unit 16, a text creating unit 17, an estimation unit 18, a setting unit 19, a playback instruction receiving unit 20, and a playback controller 21.

The first storage 11 stores therein voice data. For example, the voice data is an audio file in the form of way or mp 3. Any voice data acquiring method can be adopted. For example, the voice data can be acquired through a network such as the Internet, or can be acquired with a microphone. The playback unit 12 is a unit for playing back the voice data. For example, the playback unit 12 is a device including a speaker, a DA converter, and a headphone.

Figure 2:
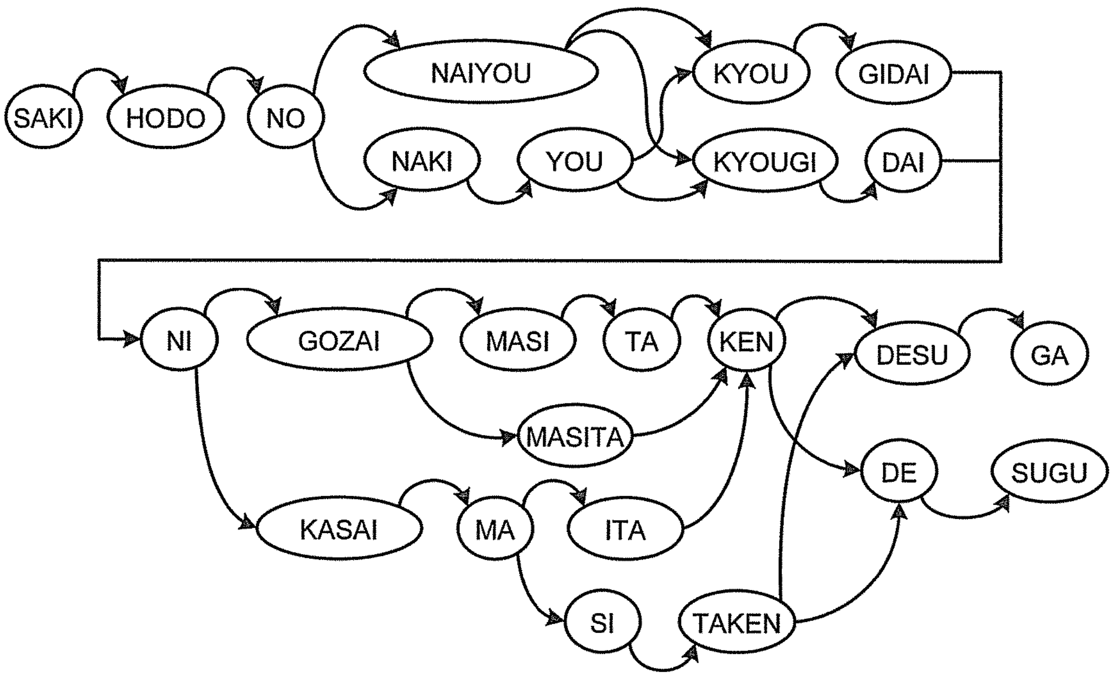
FIG. 2 is a view illustrating an example of voice text data.

The voice recognizer 13 performs a voice recognition process on the voice data and converts the voice data to the text. Text data obtained through the voice recognition process is called voice text data. Various well-known techniques can be adopted in the voice recognition process. In the embodiment, the voice text data generated by the voice recognizer 13 is divided into segments, such as words, morphemes, or clauses, each of which is smaller than a sentence, and the voice text data is expressed by a network-structure called lattice in which recognition candidates (candidates for segmentation) are connected. The expression of the voice text data is not limited thereto. For example, the voice text data can also be expressed by a linear structure (one path) indicative of the optimum recognition result of the voice recognition process. FIG. 2 is a view illustrating an example, of the voice text data that is obtained by performing the voice recognition process to voice data "sakihodo no naiyou, kyou gidai ni gozaimasita kenn desuga". The segmentation unit used in the example of FIG. 2 is a morpheme.

Referring back to FIG. 1, the index generator 14 generates voice indices, each of which associates a character string in the voice text data generated by the voice recognizer 13 with voice positional information. The voice positional information is indicative of a temporal position in the voice data and corresponds to the character string. For example, supposing the case that the voice recognizer 13 generates the voice text data illustrated in FIG. 2, the index generator 14 associates each of plural morphemes constituting the voice text data of FIG. 2 with the temporal position information in the voice data. With this, the voice indices are generated as illustrated in FIG. 3. In the voice recognition process, the voice data is processed at constant intervals of about 10 to about 20 milliseconds (ms). The association of the voice text data with the voice positional information can be acquired during the recognition process on the voice data.

In the example of FIG. 3, the voice positional information of a certain part of the voice data is expressed using temporal information indicative of a duration time (in milliseconds) necessary for the playback from the head of the part to the tail of the part. For example, voice positional information corresponding to "kyou" of FIG. 3 is "1,100 ms to 1,400 ms". This means that when the voice data is played back, a playback starting position of the voice of "kyou" is 1,100 ms and a playback ending position is 1,400 ms. In other words, the period of the voice of "kyou" starts at 1,100 ms from the head of the voice data and ends at 1,400 ms from the head of the voice data.

Referring back to FIG. 1, the voice indices generated by the index generator 14 are stored in the second storage 15. The voice indices can be created in advance of the start of the transcription work, or created in real time during the transcription work.

The input receiving unit 16 receives various inputs (hereinafter referred to as a text input) from the user in order to create the text. The user can input the text by operating a device such as a keyboard. The text creating unit 17 creates the text in response to a user's input operation. More specifically, the text creating unit 17 creates the text in response to the text input operation received by the input receiving unit 16. Hereinafter, for the sake of convenience, the text created by the text creating unit 17 is referred to as an "already-transcribed text".

Figure 4:
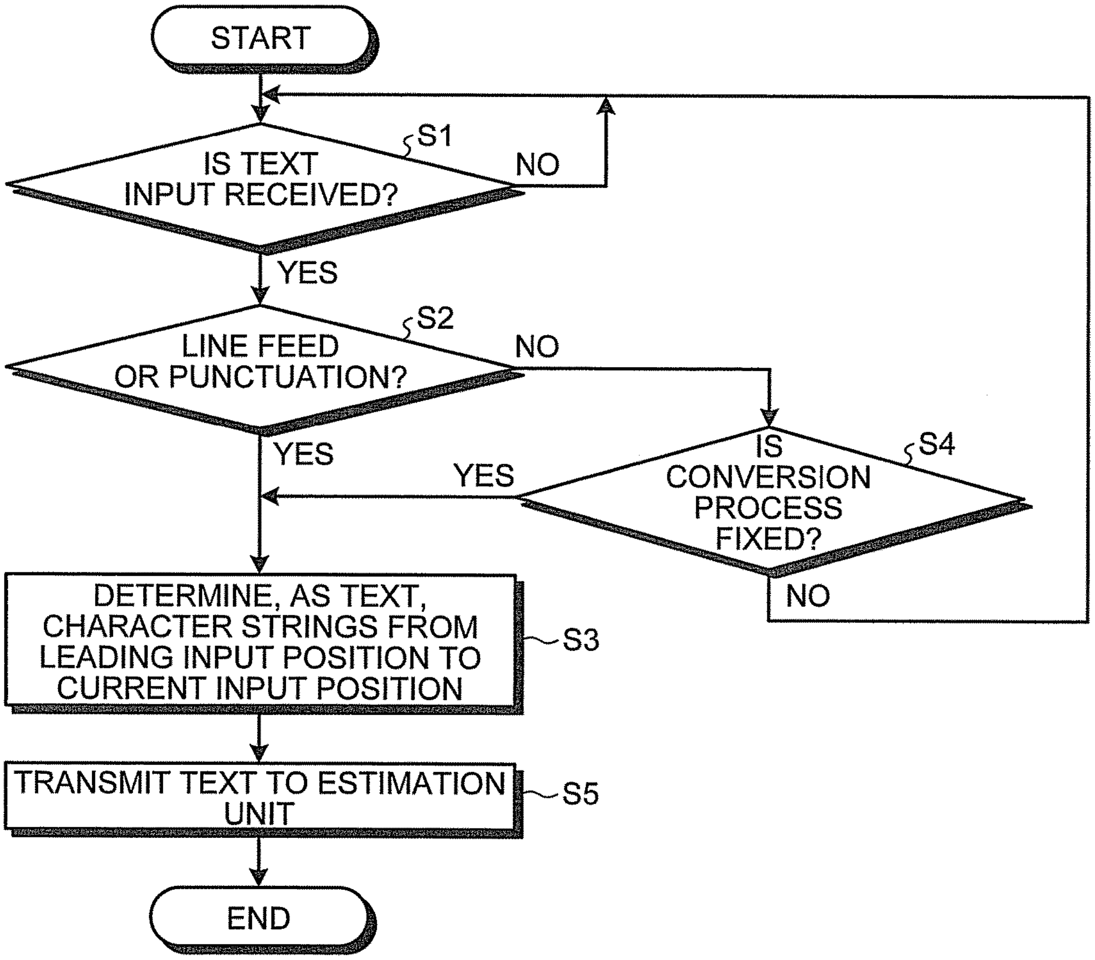
FIG. 4 is a flowchart illustrating an example of text creation process.

FIG. 4 is a flowchart illustrating an example of text creation process performed by the text creating unit 17. As illustrated in FIG. 4, when the input receiving unit 16 receives the text input (YES in Step Si), the text creating unit 17 determines whether or not the received text input is a line feed instruction or a "punctuation" instruction (Step S2). "Punctuation" denotes a punctuation mark, an interrogation mark, an exclamation mark, and the like.

When the text input received in Step Si is determined to be the line feed instruction or the "punctuation" (YES in Step S2), the text creating unit 17 determines, as a text, the character strings from a leading input position to a current input position (Step S3). On the other hand, when the text creating unit 17 determines that the text input received in Step S1 is neither the line feed instruction nor the "punctuation" (NO in Step S2), the process goes to Step S4.

In Step S4, the text creating unit 17 determines whether the received text input is an instruction to fix the conversion process. An example of the conversion process includes a process of converting a hiragana character into a kanji character(Kana-Kanji conversation). The input to fix the conversion process includes an instruction to directly fix the hiragana character without Kana-Kanji conversion. When the text creating unit 17 determines that the received text input is the instruction to fix the conversion process (YES in Step S4), the process goes to Step S3 to determine, as a text, the character strings from the leading input position to the current input position. The text creating unit 17 transmits the fixed text (already-transcribed text) to the estimation unit 18 (Step S5). With that, the text creation process is ended.

Figure 5:
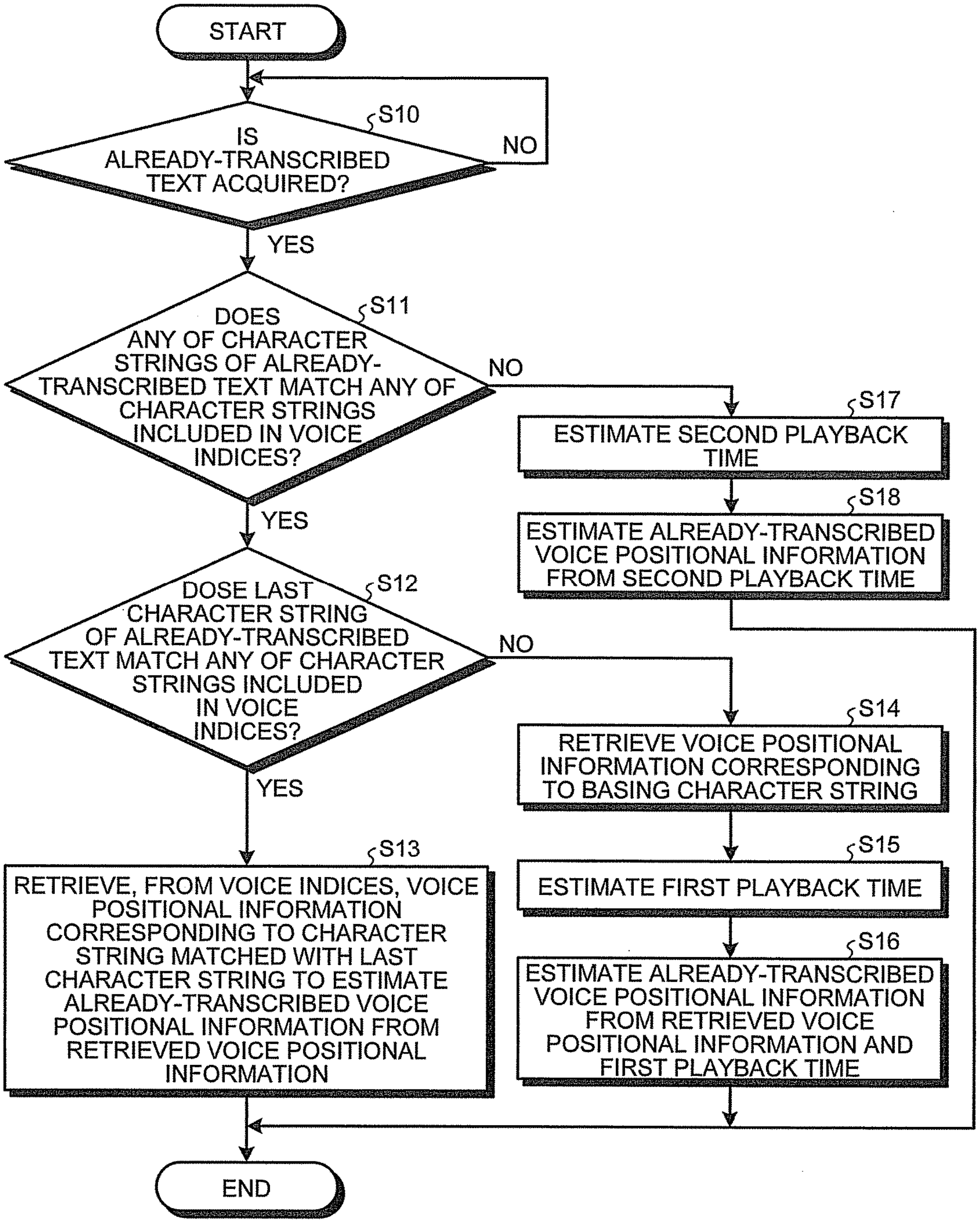
FIG. 5 is a flowchart illustrating an example of estimation process.

Referring back to FIG. 1, based on the voice indices, the estimation unit 18 estimates from the voice data the already-transcribed voice positional information indicative of a temporal position at which the creation of the text is completed. FIG. 5 is a flowchart illustrating an example of estimation process performed by the estimation unit 18. As illustrated in FIG. 5, when acquiring the already-transcribed text (YES in Step S10), the estimation unit 18 determines whether any of the character strings (in this case, the character string's unit is a morpheme) constituting the already-transcribed text match any of the character strings included in the voice indices (Step S11).

When it is determined that any of the character strings constituting the already-transcribed text matches any of the character strings included in the voice indices (YES in Step S11), the estimation unit 18 determines whether the last character string of the already-transcribed text matches any of the character strings included in the voice indices (Step S12).

When the last character string matches any of the character strings included in the voice indices (YES in Step S12), the estimation unit 18 retrieves, from the voice indices, the voice positional information corresponding to the character string that matches the last character string, so as to estimate the temporal position of the already-transcribed voice from the retrieved voice positional information (Step S13). On the other hand, when the last character string does not match any of the character strings included in the voice indices (NO in Step S12), the process goes to Step S14.

The estimation unit 18 retrieves, from the voice indices, the voice positional information corresponding to a basing character string, which is closest to the last character string among the character strings matched with any of the character strings included in the voice indices (Step S14). The estimation unit 18 estimates a first playback time indicative of a time necessary to play back the mismatched character strings, which are from next to the basing character string to the last character string, in the already-transcribed text (Step S15). Any method of estimating the first playback time can be adopted. For example, once the mismatched character strings are converted into phoneme strings, the time necessary to play back (make a voice of) them can be estimated using a standard phoneme duration time for each phoneme.

The estimation unit 18 estimates the temporal position of the already-transcribed voice data from both a) the voice positional information(the temporal position of the voice corresponding to the basing character string) retrieved in Step S14 and b) the first playback time estimated in Step S15 (Step S16). More specifically, the estimation unit 18 estimates, as the already-transcribed voice positional information, a temporal position that is ahead of the position indicative of the end of the basing character string by the first playback time estimated in Step S15.

On the other hand, in step S11 described above, when any of the character strings constituting the already-transcribed text does not match each of the voice indices (NO in Step S11), the estimation unit 18 estimates a second playback time indicative of a time necessary to play back the already-transcribed text (Step S17). Any method of estimating the second playback time can be adopted. For example, once the character strings constituting the text are converted into the phoneme strings, the time necessary to play back (utterance) the character strings constituting the text can be estimated using the standard phoneme duration time for each phoneme. The estimation unit 18 estimates the already-transcribed voice positional information from the second playback time (Step S18).

As a specific example, supposing the case that the user (transcription worker) transcribes the voice data while listening to "sakihodo no naiyou, kyou gidai ni gozaimasita kenn desuga", and the playback of the voice data is temporarily stopped at the end position of this utterance. Moreover, in this example, prior to the transcription, the voice indices of FIG. 3 are generated and stored in the second storage 15.

First, a user inputs the character string "sakihodono" and fixes the conversion of the input character string (hiragana) into the kanji character to transmit the already-transcribed text "sakihodono" to the estimation unit 18. The estimation unit 18 first determines whether any of the character strings ("saki", "hodo", and "no") constituting the already-transcribed text "sakihodono" matches any of the character strings included in the voice indices (Step S11 of FIG. 5). In this case, because the all the character strings "saki", "hodo", and "no" constituting "sakihodono" match the character strings included in the voice indices, the estimation unit 18 retrieves, from the voice indices, the voice positional information corresponding to the last character string "no" and estimates the already-transcribed voice positional information from the retrieved voice positional information (Steps S12 and S13 of FIG. 5). In this example, the estimation unit 18 estimates the ending point of the already-transcribed text as 700 ms using the voice positional information "600 ms to 700 ms" corresponding to the last character string "no".

Then, the user inputs the character string "gidaini" subsequent to the character string "sakihodono" (conversion is already fixed) and fixes the conversion of the input character string (hiragana) into the kanji character to transmit the already-transcribed text "sakihodono gidaini" to the estimation unit 18. The estimation unit 18 determines whether any of the character strings ("saki", "hodo", "no", "gidai" and "ni") constituting "sakihodono gidaini" match any of the character strings included in the voice indices (Step S11 of FIG. 5). In this case, because the all the character strings constituting "sakihodono gidaini" match the character string included in the voice indices, the estimation unit 18 retrieves, from the voice indices, the voice positional information corresponding to the last character string "ni" and estimates the already-transcribed voice positional information from the retrieved voice positional information (Steps S12 and S13 of FIG. 5). In this example, the estimation unit 18 estimates the ending point of the already-transcribed text as 1,800 ms from the voice positional information "1,700 ms to 1,800 ms" corresponding to the last character string "ni".

Then, the user inputs the character string "nobotta" subsequent to the character string "sakihodono gidaini" and fixes the input character string (fixes directly the hiragana input) to transmit the already-transcribed text "sakihodono gidaini nobotta" to the estimation unit 18. The estimation unit 18 determines whether any of the character strings ("saki", "hodo", "no", "gidai", "ni", and "nobotta") constituting "sakihodono gidaini nobotta" match any of the character strings included in the voice indices (Step S11 of FIG. 5). In this case, although the four character strings ("saki", "hodo", "no", "gidai", and "ni") among the five character strings constituting "sakihodono gidaini nobotta" match the character strings included in the voice indices, the last character string "nobotta" does not match any of the character strings included in the voice indices. That is, the last character string "nobotta" does not exist in the voice indices (NO in Step S12 of FIG. 5).

Accordingly, the estimation unit 18 retrieves, from the voice indices, the voice positional information "1,700 ms to 1,800 ms" corresponding to the basing character string "ni", which is closest to the last character string "nobotta" among the character strings matched with any of the character strings included in the voice indices (Step S14 of FIG. 5). The estimation unit 18 estimates the first playback time necessary to play back the mismatched character strings from next to the basing character string "ni" to the last character string in ("saki", "hodo", "no", "gidai", "ni", and "nobotta") constituting the already-transcribed text (Step S15 of FIG. 5). The mismatched character string is "nobotta", and an estimation result of the time necessary to play back "nobotta" is 350 ms. In this case, the estimation unit 18 estimates, as the already-transcribed voice positional information, the position "2,150 ms", that is ahead by 350 ms from "1,800 ms" which is the ending point of the voice positional information "1,700 ms to 1,800 ms" corresponding to the basing character string "ni" (Step S16 of FIG. 5).

Then, the user inputs the character string "kendesuga" subsequent to the character string "sakihodono gidatni nobotta" and fixes the conversion of the input character string (hiragana) into the kanji character to transmit the already-transcribed text "sakihodono gidaini nobotta kendesuga" to the estimation unit 18. The estimation unit 18 determines whether any of the character strings ("saki", "hodo", "no", "gidai", "ni", "nobotta", "ken", "desu", and "ga") constituting the already-transcribed text "sakihodono gidaini nobotta kendesuga" match any of the character strings included in the voice indices (Step S11 of FIG. 5). In this case, because the eight character strings ("saki", "hodo", "no", "gidai", "ni", "ken", "desu", and "ga") out of nine constituting the already-transcribed text "sakihodono gidaini nobotta kendesuga" match the character strings included in the voice indices, and the last character string "ga" also matches the character string included in the voice indices. Therefore, the estimation unit 18 retrieves, from the voice indices, the voice positional information corresponding to the last character string "ga" and estimates the already-transcribed voice positional information from the retrieved voice positional information (Steps S12 and S13 of FIG. 5). In this example, the estimation unit 18 estimates the ending point as 2,900 ms from the voice positional information "2,800 ms to 2,900 ms" corresponding to the last character string "ga".

In this case, the estimation unit 18 ignores, among the character strings constituting the already-transcribed text, the character string "nobotta" that does not exist in the voice indices and estimates the temporal position of the already-transcribed voice using the voice positional information corresponding to the last character string by putting a high priority on the fact that the last character string matches the character string included in the voice indices. That is, when the last character string of the text matches any of the character strings included in the voice indices, the already-transcribed voice positional information is unconditionally estimated from the voice positional information corresponding to the last character string. Alternatively, it is possible to employ a configuration in which the already-transcribed voice positional information is not estimated from the voice positional information corresponding to the last character string as long as some condition is satisfied, even if the last character string matches any of the character strings included in the voice indices.

The above condition can arbitrarily be set in advance. For example, the estimation unit 18 can use the predetermined condition which is satisfied when the number of character strings matched with the voice indices is equal to or larger than a threshold. Or, the estimation unit 18 can use that the predetermined condition which is satisfied, when the character string other than the last character string of the already-transcribed text matches the voice index, and when a difference between the position corresponding to the character string closest to the last character string matched with the voice index and the position corresponding to the last character string falls within a predetermined range.

Referring back to FIG. 1, the setting unit 19 sets the playback starting position indicative of the position at which the playback is started in the voice data based on the already-transcribed voice positional information estimated by the estimation unit 18. In the embodiment, the setting unit 19 sets the position indicated by the already-transcribed voice positional information estimated by the estimation unit 18 to the playback starting position. The playback instruction receiving unit 20 receives a playback instruction to play back the voice data. For example, the user operates a pointing device such as a mouse to select a playback button displayed on a computer screen, which allows the user to input the playback instruction. However, any playback instruction input method can be adopted. In the embodiment, the user can input various instructions by operating the pointing device such as the mouse to select a stop button, a rewind button, a fast-forward button, which is displayed on the computer screen. And the user can control the playback of the voice data.

When the playback instruction receiving unit 20 receives the playback instruction, the playback controller 21 controls the playback unit 12 such that the voice data is played back from the playback starting position set by the setting unit 19. The playback controller 21 can be implemented by an audio function possessed by an operation system or a driver of the PC. Alternatively, the playback controller 21 can be made by a hardware circuit such as an electronic circuit.

In the embodiment, the first storage 11, the playback unit 12, and the second storage 15 are made by the hardware circuit. On the other hand, each of the voice recognizer 13, the index generator 14, the input receiving unit 16, the text creating unit 17, the estimation unit 18, the setting unit 19, the playback instruction receiving unit 20, and the playback controller 21 is implemented such that a CPU mounted on the PC executes a control program stored in ROM. Alternatively, at least a part of the voice recognizer 13, the index generator 14, the input receiving unit 16, the text creating unit 17, the estimation unit 18, the setting unit 19, the playback instruction receiving unit 20, and the playback controller 21 can be made by the hardware circuit.

As described above, the transcription support system 100 of the embodiment estimates the temporal position of the already-transcribed voice (that is, the position at which the transcription is completed) using both a) the plural character strings constituting the voice text data obtained by the voice recognition process, and b) the voice indices, each of which is associated with the voice positional information. Therefore, when the user transcribes the audio file while correcting the filler and the grammatical error that are included in the voice data, the user can correctly specify the position at which the transcription is completed even if the already-transcribed text differs from the voice text data (voice recognition result). In the transcription support system 100 of the embodiment, because the position indicated by the estimated already-transcribed voice positional information is set to the playback starting position, it is not necessary for the user to set the playback starting position with the position at which the transcription is completed while repeating the rewind or fast-forward of the voice data. Therefore, the work efficiency can be improved.

(1) First Modification

In the embodiment described above, the PC is used as the transcription support system. The transcription support system is not limited to the PC. For example, a system including a first device (such as a tape recorder) having the function of playing back the voice data and a second device having a function of creating the text can be used as the transcription support system. The above units (such as the first storage 11, the playback unit 12, the voice recognizer 13, the index generator 14, the second storage 15, the input receiving unit 16, the text creating unit 17, the estimation unit 18, the setting unit 19, the playback instruction receiving unit 20, and the playback controller 21) can be included in either one of the first device and the second device.

(2) Second Modification

In the embodiment described above, a language to be transcribed is Japanese. However, any language can be the target of the transcription work. For example, the target language of the transcription can be English or Chinese. In the case of English transcription, the transcribed sentence is English. In this case, although the already-transcribed voice positional information estimation method is substantially identical to that in Japanese, English differs from Japanese only in the estimation of the first playback time and the second playback time. Because English input character string is an alphabetical string, it is necessary to use the phoneme duration time for an alphabetical string. As to the phoneme duration time for the alphabetical string, the first playback time and the second playback time can be estimated using the duration times of a vowel and a consonant or the duration time in a syllabic unit. On the other hand, in the case of Chinese transcription, the transcribed sentence is Chinese. In this case, although the already-transcribed voice positional information estimation method is substantially identical to that in Japanese, Chinese differs from Japanese only in the estimation of the first playback time and the second playback time. Because a pinyin is determined for each input character in Chinese, the first playback time and the second playback time are estimated using the phoneme duration time for a pinyin string.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A text processing device comprising:

a memory having computer executable components stored therein; and a processing circuit communicatively coupled to the memory, the processing circuit configured to generate voice indices, each of which associates a character string obtained from a voice recognition process with voice positional information, the voice positional information indicative of a temporal position in voice data and corresponding to the character string;

create text in response to an operation input of a user; and when determining that a last character string of the text does not match any of the character strings included in the voice indices and further determining that any of the character strings other than the last character string of the text matches any of the character strings included in the voice indices, retrieve, from the voice indices, the voice positional information corresponding to a basing character string indicative of a character string closest to the last character string among the character strings matched with any of the character strings included in the voice indices, estimate a first playback time indicative of a time necessary to play back mismatched character strings indicative of the character strings from the character string next to the basing character string to the last character string among the character strings constituting the text, estimate already-transcribed voice positional information from the voice positional information corresponding to the basing character string and the first playback time, the already-transcribed voice positional information indicative of a temporal position at which the creation of the text is completed in the voice data, set the temporal position indicated by the estimated already-transcribed voice positional information as a playback starting position, and a playback circuit configured to play back the voice data based on the already-transcribed voice positional information at the first playback time.

2. The device according to claim 1, wherein a unit of each of the character strings constituting the created text is a morpheme.

3. The device according to claim 1, wherein the processing circuit estimates the already-transcribed voice positional information by using a predetermined phoneme duration time.

4. The device according to claim 3, wherein the processing circuit estimates the first playback time based on the predetermined phoneme duration time, and estimates voice positional information the first playback time ahead of the voice positional information corresponding to the basing character string as the already-transcribed voice positional information.

5. A text processing device comprising:

a memory having computer executable components stored therein; and a processing circuit communicatively coupled to the memory, the processing circuit configured to generate voice indices, each of which associates a character string obtained from a voice recognition process with voice positional information, the voice positional information indicative of a temporal position in voice data and corresponding to the character string;

create text in response to an operation input of a user until a punctuation is input; and when determining that a last character string of the text does not match any of the character strings included in the voice indices and further determining that any of the character strings other than the last character string of the text matches any of the character strings included in the voice indices, retrieve, from the voice indices, the voice positional information corresponding to a basing character string indicative of a character string closest to the last character string among the character strings matched with any of the character strings included in the voice indices, estimate a first playback time indicative of a time necessary to play back mismatched character strings indicative of the character strings from the character string next to the basing character string to the last character string among the character strings constituting the text, estimate already-transcribed voice positional information from the voice positional information corresponding to the basing character string and the first playback time, set the temporal position indicated by the estimated already-transcribed voice positional information as a playback starting position, and a playback circuit configured to play back the voice data based on the already-transcribed voice positional information at the first playback time.

6. The device according to claim 5, wherein a unit of each of the character strings constituting the created text is a morpheme.

7. A text processing method comprising:

generating voice indices, each of which associates a character string obtained from a voice recognition process with voice positional information, the voice positional information indicative of a temporal position in voice data and corresponding to the character string;

creating text in response to an operation input of a user; and when it is determined that a last character string of the text does not match any of character strings that are included in the voice indices and when it is further determined that any of the character strings other than the last character string of the text matches any of the character strings included in the voice indices, retrieving, from the voice indices, the voice positional information corresponding to a basing character string indicative of a character string closest to the last character string among the character strings matched with any of the character strings included in the voice indices, first estimating a first playback time indicative of a time necessary to play back mismatched character strings indicative of the character strings from the character string next to the basing character string to the last character string among the character strings constituting the text, second estimating already-transcribed voice positional information from the voice positional information corresponding to the basing character string and the first playback time, the already-transcribed voice positional information indicative of a temporal position at which the creation of the text is completed in the voice data, setting the temporal position indicated by the estimated already-transcribed voice positional information as a playback starting position, and playing back the voice data based on the already-transcribed voice positional information.

8. The method according to claim 7, wherein the creating includes creating the text in accordance with an input of the user who listens to the voice data.

9. The method according to claim 7, wherein a unit of each of the character strings constituting the created text is a morpheme.

10. The method according to claim 7, wherein the second estimating includes estimating the already-transcribed voice positional information by using a predetermined phoneme duration time.

* * * * *